United States Patent
Meyer et al.

Patent Number: 5,451,358
Date of Patent: Sep. 19, 1995

[54] PROCESS AND APPARATUS FOR MAKING A THERMOBONDING PRODUCT

[75] Inventors: Jean Meyer, Spechbach-le-Haut; Pascal Strub, Mulhouse, both of France

[73] Assignee: Protechnic S.A., Cernay, France

[21] Appl. No.: 920,417

[22] Filed: Jul. 27, 1992

[30] Foreign Application Priority Data

Jul. 30, 1991 [FR] France ............... 91 09844

[51] Int. Cl.⁶ ............... B29C 43/24; B29C 43/46
[52] U.S. Cl. ............... 264/175; 264/167; 264/211.12; 264/345; 425/73; 425/174.4; 425/210; 425/367; 425/377; 425/445
[58] Field of Search ............... 264/175, 167, 210.1, 264/234, 235, 345, 346, 211.12, 25; 425/73, 74, 75, 367, 445, 210, 174.4, 377, 446

[56] References Cited

U.S. PATENT DOCUMENTS

| | | | |
|---|---|---|---|
| 2,125,859 | 8/1938 | Liebelt | 425/367 |
| 2,177,661 | 10/1939 | Kimble | 264/175 |
| 2,957,200 | 10/1960 | Pufahl et al. | 425/367 |
| 3,294,613 | 12/1966 | Eichler | 264/175 |
| 3,471,897 | 10/1967 | Baxter | 425/73 |
| 3,746,607 | 7/1973 | Harmon et al. | |
| 3,798,294 | 3/1974 | Hollenbeck | 264/175 |
| 4,066,724 | 1/1978 | Matsubara | 264/175 |
| 4,323,533 | 4/1982 | Bramhall | |
| 4,507,351 | 3/1985 | Johnson et al. | |
| 5,075,064 | 12/1991 | Kawaratani et al. | 425/75 |
| 5,236,640 | 8/1993 | Heiderich et al. | 264/175 |

FOREIGN PATENT DOCUMENTS

| | | |
|---|---|---|
| 0301599 | 2/1989 | European Pat. Off. |
| 0447595 | 9/1991 | European Pat. Off. |
| 1246923 | 10/1960 | France |
| 1474145 | 2/1967 | France |

*Primary Examiner*—Mathieu D. Vargot
*Attorney, Agent, or Firm*—Young & Thompson

[57] ABSTRACT

Process for producing a thermobonding product by extruding a thermofusible mass (1) and scraping it in molten state onto an incised cylinder (2) regulated as to temperature between about 120° C. and 250° C., calendaring the mass (1) with this cylinder (2) and an elastomeric silicone cylinder (3), while transferring it onto the elastomeric cylinder (3), which simultaneously effects a consolidation of the product (1) by cooling. The product is then transferred either onto a conveyor band (4) and brought by the conveyor, after passage through thermal treatment zones (5), to a roll winding-up station (6), or directly, in the form of continuous or discontinuous structure, onto a final utilization or transfer support (17). The invention is particularly applicable in the field of the textile industry, particularly for bonding or reinforcing.

9 Claims, 1 Drawing Sheet

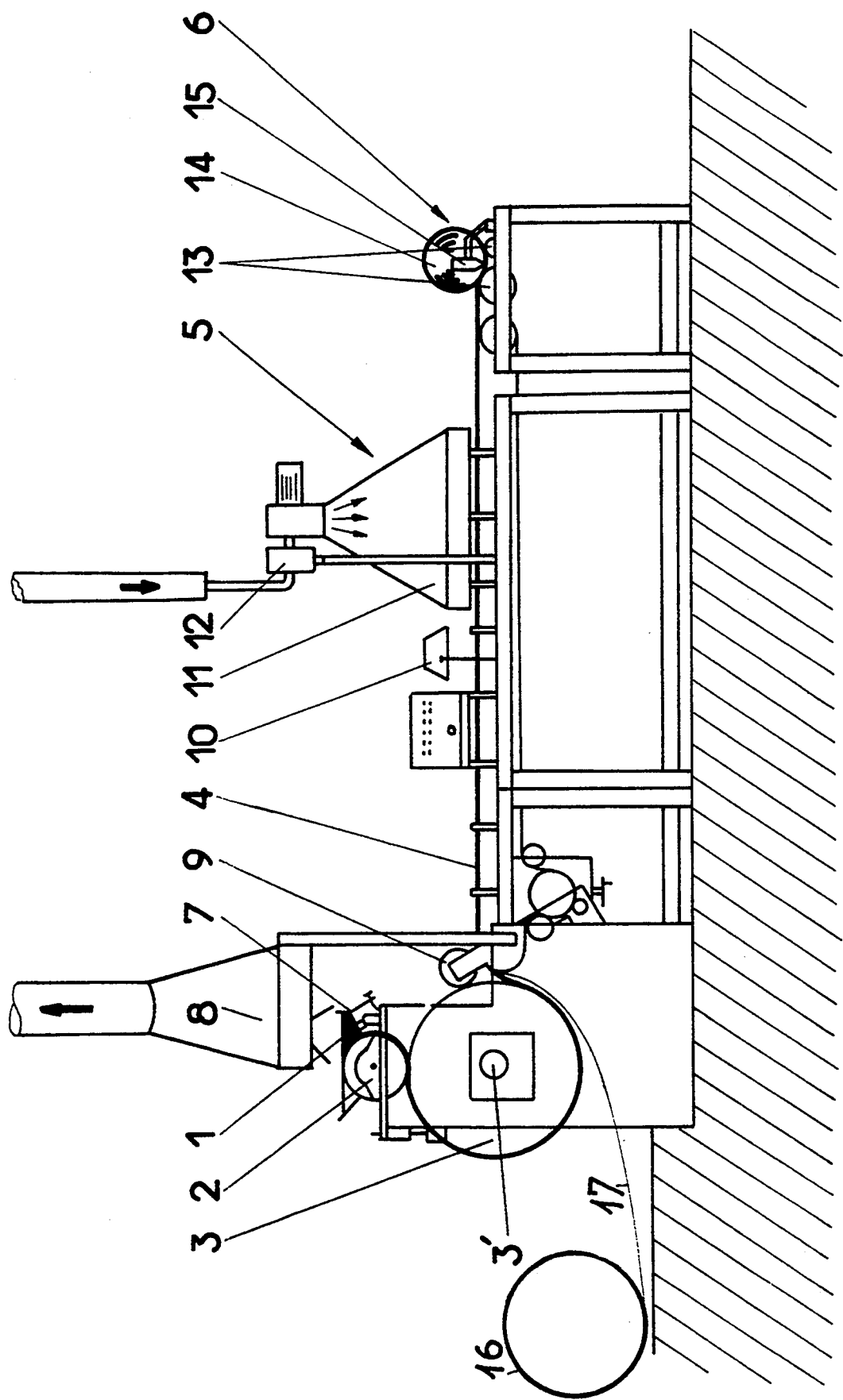

PROCESS AND APPARATUS FOR MAKING A THERMOBONDING PRODUCT

FIELD OF THE INVENTION

The present invention relates to the field of making thermofusible products and has for its object a process for making a thermobonding product.

The invention also has for its object an apparatus for practicing this process, as well as the product obtained.

BACKGROUND OF THE INVENTION

There exist at present thermobonding meshes in the form of strips or sheets, utilizable particularly in the field of the textile industry, particularly for bonding or reinforcement, and which are generally mounted on transfer supports. These transfer supports are constituted by paper, whose surface turned toward the mesh is provided with a silicone coating forming a surface of weak adherence favoring the transfer of the thermobonding mesh onto the cloth under the influence of heat and pressure.

These sheets or strips of thermobonding material permit, because of their relatively low weight of cement per unit of surface and their mesh structure, a bonding of the textile materials preserving their initial flexibility properties.

However, these known sheets or strips have the drawback, during their production, of requiring the simultaneous unrolling of a strip of silicone paper comprising the support, which complicates further the process of making by addition of supplemental operations, from which also result an increase in the cost of the sheets obtained.

Moreover, these known methods of manufacture, because of the use of silicone paper, result, for a given total surface of sheet in one roll, in a high weight and volume relative to the surface of the sheet or strip.

Still further, during use of the known sheets or strips, it is necessary after their application under pressure and heat to pull off and dispose of the silicone support paper, which involves supplemental operations, often manual, and as a result, an increase in the time and hence the cost of manufacture.

SUMMARY OF THE INVENTION

The present invention has for its object to overcome these drawbacks.

It thus has for its object a process for production of a thermobonding product characterized in that it consists essentially in extruding a thermofusible mass and scraping it in molten condition onto an incised cylinder regulated in temperature to between about 120° and 250° C., calendaring the mass by means of this cylinder and an elastomeric silicone cylinder, while transferring it onto the elastomeric cylinder, which produces simultaneously a consolidation of the product by cooling, then transferring the product, either onto a conveyor band and bringing it by means of this latter, after passage through thermal treatment zones, to a wind-up station, or directly, in the form of continuous or discontinuous structure onto the final use or transfer support.

The invention also has for its object an apparatus for practicing this process characterized in that it is essentially constituted by an incised cylinder coacting with an elastomeric calendaring and transfer cylinder, by a conveyor band, by a thermal treatment station of the product and by a wind-up station.

BRIEF DESCRIPTION OF THE DRAWING

The invention will be better understood, thanks to the following description, which relates to a preferred embodiment, given by way of non-limiting example, and explained with reference to the accompanying schematic drawing, whose single FIGURE is a side elevational view of apparatus for practicing the process according to the invention.

DETAILED DESCRIPTION OF THE INVENTION

As shown by way of example in the accompanying drawing, the process of making a thermobonding product consists essentially in extruding a thermofusible mass 1 and scraping it in molten condition onto an incised cylinder 2 regulated as to temperature between about 120° C. and 250° C., calendaring the mass by means of this cylinder 2 and an elastomeric silicone cylinder 3, while transferring it onto said elastomeric cylinder 3, which at the same time effects a consolidation of the product by cooling.

This product is then transferred, either onto a conveyor band 4 and is brought by means of this latter, after passage through thermal treatment zones, and particularly a thermal treatment station 5, to a wind-up station 6, or directly, in the form of continuous or discontinuous structure, onto a final utilization or transfer support. A final utilization support could particularly be in the form of a support sensitive to the high heat of the incised cylinder, such as woven or non-woven fabrics, which can be used directly without transfer and which risk being altered by the high heat. Moreover, by the term discontinuous structure are designated all forms of embodiment possible of the thermobonding product other than a strip embodiment, namely an arrangement in dots, plugs, or by any other elements of any geometric form not connected with each other.

It is of course also possible to arrange the thermobonding product on a transfer support such as a plastic film or silicone paper, for certain particular uses.

The incised cylinder 2 forms with the elastomeric silicone cylinder 3 a high pressure calendar which produces among other things the transfer of the mass formed by the incising, from one cylinder to the other.

The cylinder 3 produces, among other things, a consolidation of the product by cooling so as to facilitate its detachment and the transfer onto the conveyor band 4.

The fused polymer is distributed in the incisions on the cylinder 2 by means of a scraper 7 and the cooled elastomeric cylinder 3 is mounted on a movable bearing 3' displaceable under the action of jacks or mechanical eccentric devices, or other devices (not shown) for regulating the position in the direction of the incised cylinder 2, a hood 8 surmounting the assembly and withdrawing the polymer vapors.

Thus, the melted polymer is scraped against the incised cylinder 2, where it fills all the incisions and, thanks to the pressure of the elastomeric cylinder 3 on the incised cylinder 2, as well as the cooling provided by the cylinder 3, the incisions of the cylinder 2 acting with the elastomeric cylinder 3 form the mesh to be produced. Such a product can be obtained thanks to the properties of the coating used which, because of its elasticity, permits high pressures making possible the deposit of a mesh-shaped product, or any other structures, on the elastomeric cylinder 3. Furthermore, the temperature control of the elastomer avoids the aging of the cylinder 3.

At the point of transfer between the elastomeric cylinder 3 and the conveyor band 4, there is provided also a cylinder 9 for brushing against the elastomeric cylinder 3. This cylinder 9 is adapted to promote the unsticking of the product transferred by the cylinder 3, from said cylinder 3.

According to a characteristic of the invention, the conveyor band 4 is preferably provided with a rough coating having bristles inclined in the direction of movement of band 4. Such a coating promotes the gripping of the mesh-shaped product obtained and prevents its sliding.

The transfer of the product in the form of a mesh obtained on the conveyor band 4 is effected, during the phase of starting production, by cementing a paper strip on the leading end of the product strip, so as to permit grasping this beginning strip between the brushing cylinder 9 and the conveyor band 4, then its transfer onto said band 4.

It is also possible to provide a preliminary coating of the elastomeric cylinder 3 over half its periphery, then to begin the unsticking of the product in mesh form over a certain length, to effect a new coating on the product in the form of a mesh so as to form a connection and, finally, thanks to the onset of unsticking, to transfer the product onto the band 4.

The thermal treatment station 5 is constituted by an infrared heating device 10 and by an assembly 11 for cooled ventilation by means of a water circulation device 12.

For products that crystallize slowly, during the transfer of the product in the form of a mesh on the conveyor band 4, the product, on the one hand, is stretched and on the other hand is located in said condition of amorphous structure, that is, it has not yet achieved a stable structure at the molecular level, not having achieved a temperature sufficiently low to be a crystalline structure.

This would have as a result crystallization after winding, involving shrinkage in length of about 20% and tackiness, which is to say cold bonding under pressure, requiring careful unwinding of the roll.

To this end, the infrared heating device 10 is adapted to bring the temperature of the product in mesh form to its vitreous transition point, so as to ensure its dimensional stability and to prevent shrinkage of the material, the ventilation assembly 11 limiting the tackiness by rapid cooling.

In the case of transfer of the product directly onto a final utilization or transfer support, the device is completed by unrolling means 16 mounted upstream of the cylinders 2 and 3 and unwinding a final utilization or transfer support 17 below the elastomeric silicone cylinder 3 upstream of the conveyor band 4, the support 17 thus fed being adapted to be rolled up at the winding station 6 or any other device. Thus, it is possible to provide the overlaying of certain supports that are relatively fragile at the temperature, particularly woven or non-woven fabrics, which are then directly usable, without requiring preliminary emplacement of a thermobonding product, nor a deposit of the thermobonding product onto a transfer support.

Thanks to the modular construction of the apparatus for practicing the process according to the invention, it is possible easily to add upstream of the coating head constituted by the scraper 7 and the incised cylinder 2, this supplemental unwinding means 16, which permits a direct printing on a paper, textile or other support, this printing being in the form of a mesh, of dots or of any other geometric motif.

It is also possible to effect printing by hot transfer onto supports requiring a great flexibility or having mechanical or thermal characteristics incompatible with direct printing by the device 7.

The winding-up station 6 is constituted by two rotating cylinders 13 on which bears the roll 14 for rolling up the product in the form of a mesh, jacks 15 acting on a bar passing through the support tube of the roll 14 to apply it against the cylinders 13.

The invention also has for its object a thermobonding product obtained by practicing the process by means of apparatus shown in the accompanying drawing showing a continuous structure in the form of a mesh or the like and not requiring a disposable support.

According to a modification of the invention, the thermobonding product is disposed directly in the form of a continuous or discontinuous structure, on a final utilization support.

The thermal treatment provided during the process according to the invention has for its object to stabilize the important mechanical contractions undergone by the product during its transfers, by point application of heat bringing the polymer constituting said product into the temperature zone comprised between the vitreous transformation point and the melting point, the tack which would prevent winding up, being reduced by abrupt cooling by blowing refrigerated air just before winding up.

Of course, the invention is not limited to the embodiment described and illustrated in the accompanying drawing. Modifications remain possible, particularly as to the construction of the various elements or by substitution of equivalent techniques, without thereby departing from the scope of protection of the invention.

We claim:

1. Process for the production of a thermobonding product which comprises: extruding a thermofusible mass; scraping said mass in molten condition on an incised cylinder so as to fill incisions on said incised cylinder which is regulated as to temperature between 120° and 250° C.; said incised cylinder forming with an elastomeric silicone cylinder a high pressure calendar, calendaring said mass with said incised cylinder and said elastomeric silicone cylinder, while transferring said mass onto said elastomeric cylinder, which simultaneously effects a consolidation of the mass to form the thermobonding product by cooling; then transferring the thermobonding product, either a) onto a conveyor band which conveys said product, after passage through a thermal treatment station, to a winding-up station, or b) directly onto a final utilization support.

2. Apparatus for the production of a thermobonding product comprising: means for extruding a thermofusible mass and means for scraping it in molten condition on an incised cylinder so as to fill incisions on said incised cylinder which is regulated as to temperature between 120° C. and 250° C., said incised cylinder forming with an elastomeric silicone cylinder a high pressure calendar means for calendaring said mass with said incised cylinder and said elastomeric silicone cylinder, while transferring it onto said elastomeric cylinder, which simultaneously effects a consolidation of the mass to form the thermobonding product by cooling, and means for transferring the thermobonding product, either a) onto a conveyor band which brings said product after passage through a thermal treatment station, to a winding-up station, or b) directly onto a final utilization support.

3. Apparatus according to claim 2, wherein the means for scraping constitute a scraper for distributing the molten mass into incisions of the incised cylinder, said elastomeric cylinder being mounted on a movable bearing displaceable under the action of means for regulating the position in the direction of the incised cylinder.

4. Apparatus according to claim 2, further including at the point of product transfer between the elastomeric cylinder and the conveyor band, a cylinder for brushing the elastomeric cylinder.

5. Apparatus according to claim 2, wherein the conveyor band is provided with a rough coating having bristles inclined in the direction of movement of the band.

6. Apparatus according to claim 2, wherein the thermal treatment station includes an infrared radiation device and a ventilation assembly cooled by means of a water-circulation installation.

7. Apparatus according to claim 6, further including a hood surmounting the ventilation assembly for drawing off vapors.

8. Apparatus according to claim 2, wherein the product is directly transferred onto a final utilization support, and said apparatus further comprises unrolling means mounted upstream of the incised cylinder and the elastomeric cylinder, said unrolling means unrolling a support for final use under the elastomeric silicone cylinder upstream of the conveyor band, said support thus fed being adapted to be rolled up at the winding-up station.

9. Apparatus according to claim 2, wherein the winding-up station includes two rotating cylinders against which bears a roll having a support tube for rolling up the product in the form of a mesh, and jacks acting on a bar traversing the support tube of the roll to apply said roll against said rotating cylinders.

* * * * *